(12) United States Patent
MacQuin et al.

(10) Patent No.: US 10,371,846 B2
(45) Date of Patent: *Aug. 6, 2019

(54) ANTIFOULING PROTECTIVE SKIN SECTION FOR SEISMIC SURVEY EQUIPMENT AND RELATED METHODS

(71) Applicant: CGG SERVICES SA, Massy (FR)

(72) Inventors: Raphael MacQuin, Montrouge (FR); Karine Desrues, Massy (FR)

(73) Assignee: CGG SERVICES SAS, Massy (FR)

( * ) Notice: Subject to any disclaimer, the term of this patent is extended or adjusted under 35 U.S.C. 154(b) by 497 days.

This patent is subject to a terminal disclaimer.

(21) Appl. No.: 14/194,851

(22) Filed: Mar. 3, 2014

(65) Prior Publication Data

US 2014/0247690 A1 Sep. 4, 2014

Related U.S. Application Data

(60) Provisional application No. 61/772,197, filed on Mar. 4, 2013.

(51) Int. Cl.
*G01V 1/38* (2006.01)

(52) U.S. Cl.
CPC .................. *G01V 1/3843* (2013.01)

(58) Field of Classification Search
CPC .................. G01V 1/38; G01V 1/3843
USPC ......................................... 367/15
See application file for complete search history.

(56) References Cited

U.S. PATENT DOCUMENTS

| | | | |
|---|---|---|---|
| 2,570,059 A | 10/1951 | Hurxthal et al. | |
| 3,181,300 A | 5/1965 | Plummer | |
| 3,185,497 A | 5/1965 | Charles | |
| 3,531,760 A | 9/1970 | Whitfill, Jr. | |
| 3,587,657 A | 6/1971 | Staller | |
| 3,650,009 A | 3/1972 | Ausnit et al. | |
| 3,922,464 A * | 11/1975 | Silver | C09J 7/045 427/208 |
| 4,620,396 A * | 11/1986 | Bjorntwedt | B65D 75/14 383/4 |
| 4,816,111 A | 3/1989 | Pittarello et al. | |

(Continued)

FOREIGN PATENT DOCUMENTS

| | | |
|---|---|---|
| DE | 19903868 C1 | 3/2000 |
| EP | 0787871 A1 | 8/1997 |

(Continued)

OTHER PUBLICATIONS

Baum, "Go-Faster Strips, Stripes, Riblets, etc.: Speedskating Drag Reduction and the 'Lost Dutchman Olympic Gold Mine'," 1998, downloaded Nov. 9, 2011 from http:/ /sbspeed ,s5 .com/Riblet Flow .html, 10 pp.*

(Continued)

*Primary Examiner* — Daniel L Murphy
(74) *Attorney, Agent, or Firm* — Patent Portfolio Builders PLLC (57) ABSTRACT

One or more portions of a streamer or other equipment of a seismic survey system (e.g., birds, buoys, deflectors, etc.) are covered with protective removable skin sections. A protective removable skin section includes a flexible sheet and a reversible closure system configured to join edges of the flexible sheet. The protective removable skin section may be mounted onboard of a vessel, when the equipment is deployed.

20 Claims, 6 Drawing Sheets

(56) References Cited

U.S. PATENT DOCUMENTS

| | | | |
|---|---|---|---|
| 5,217,176 A * | 6/1993 | Hall | B63B 21/66 |
| | | | 226/170 |
| 5,226,380 A | 7/1993 | Fischer | |
| 5,459,695 A | 10/1995 | Manison | |
| 7,835,222 B2 | 11/2010 | Lobe et al. | |
| 7,842,288 B2 * | 11/2010 | Weed | B05D 7/54 |
| | | | 106/1.23 |
| 8,541,439 B2 * | 9/2013 | Eyster | A01N 25/34 |
| | | | 405/216 |
| 9,103,034 B2 * | 8/2015 | Bell | C23C 18/54 |
| 2004/0240945 A1 | 12/2004 | Frantz | |
| 2004/0241433 A1 | 12/2004 | Howard | |
| 2006/0002234 A1 | 1/2006 | Lobe et al. | |
| 2006/0024508 A1 | 2/2006 | D'Urso et al. | |
| 2007/0166464 A1 * | 7/2007 | Acatay | D01D 5/0007 |
| | | | 427/346 |
| 2008/0015298 A1 * | 1/2008 | Xiong | C08K 3/22 |
| | | | 524/432 |
| 2010/0020644 A1 | 1/2010 | Vignaux | |
| 2010/0278011 A1 * | 11/2010 | Harrick | G01V 1/201 |
| | | | 367/20 |
| 2011/0174207 A1 | 7/2011 | Harrick et al. | |
| 2011/0255369 A1 | 10/2011 | Harrick et al. | |
| 2012/0009236 A1 | 1/2012 | Eyster et al. | |
| 2012/0176858 A1 | 7/2012 | Stenzel et al. | |
| 2014/0041450 A1 | 2/2014 | Macquin | |
| 2014/0241120 A1 | 8/2014 | Blackhall et al. | |
| 2014/0356587 A1 * | 12/2014 | Hara | B63B 59/045 |
| | | | 428/189 |

FOREIGN PATENT DOCUMENTS

| | | | |
|---|---|---|---|
| EP | 1584253 | A2 | 10/2005 |
| EP | 2700981 | A1 | 2/2014 |
| GB | 1579123 | A | 11/1980 |
| WO | 2006134381 | A1 | 12/2006 |
| WO | 2011070411 | A2 | 6/2011 |
| WO | 2012006687 | A1 | 1/2012 |

OTHER PUBLICATIONS

Office Action received in corresponding Australian Application No. 2014201059, dated Jul. 5, 2017.

Alpha Wire, Datasheet, FIT Wire Management Zipper Tubing ZIP-41.

D. Milanov et al., "Examination of the capabilities of attachment and biofilm formation of differenct Listeria monocytogenes strains", Biotechnology in Animal Husbandry 25.5, 2009, pp. 1255-1265.

Materials World Magazine, Material of the Month: Superhydrophobic Materials—Surface Properties, Aug. 1, 2013.

Office Action, dated Dec. 21, 2015, in corresponding/related U.S. Appl. No. 14/155,421.

Office Action, dated May 2, 2018, in corresponding/related European Application No. 13 179 657.5.

Office Action, dated Nov. 5, 2014, from corresponding/related Singaporean Application No. 2013061049.

Office Action, dated Sep. 16, 2015, in corresponding/related U.S. Appl. No. 13/964,178.

The Zippertubing Company, Brochure, 2009, URL: http://www.zippertubing.com/Closure-Options.aspx, retrieved using Way Back Machine on Aug. 27, 2015.

Thomas Ramotowski et al., "NUWC XP-1 polyurethane-urea: a new 'acoustically transparent' encapsulant for underwater transducers and hydrophones", Oceans 2003, Proceedings, vol. 1, IEEE, 2003.

* cited by examiner

ANTIFOULING PROTECTIVE SKIN SECTION FOR SEISMIC SURVEY EQUIPMENT AND RELATED METHODS

CROSS-REFERENCE TO RELATED APPLICATIONS

This application claims priority and benefit from U.S. Provisional Patent Application No. 61/772,197, filed Mar. 4, 2013, for "Pre-cut antifouling protective skin for highly fouled areas," the entire content of which is incorporated in its entirety herein by reference.

BACKGROUND

Technical Field

Embodiments of the subject matter disclosed herein generally relate to preventing deposits (bio-fouling) on equipment (e.g., streamers, head buoys, tail buoys, etc.) used underwater for marine seismic surveys, and, more particularly, to pre-cut skin sections configured to cover and thus, protect portions of the equipment from fouling.

Discussion of the Background

In view of continually increasing interest in offshore drilling, marine seismic surveys are used to generate a profile (image) of the geophysical structure under the seafloor, based on which the presence or absence of oil and/or gas can be predicted. Marine seismic exploration surveys use seismic receivers such as hydrophones distributed along cables commonly referred to as "streamers" or "seismic streamers." Plural seismic streamers and one or more seismic wave sources are towed together with other equipment (birds, buoys, deflectors, etc.). After a seismic wave source fires a shot (i.e., generates seismic waves), the seismic receivers acquire data related to reflections and refractions of the generated seismic waves. For example, the time interval between a moment when a shot is fired and when seismic receivers detect a shot-related reflection provides information about the location (depth) of reflecting interfaces inside the geophysical structure under the seafloor.

Seismic exploration campaigns may last long periods (e.g., several months). During these campaigns, the streamers and other equipment preferably remain in the water (except, for example, in cases of extreme unfavorable weather conditions) because recovering/deploying the seismic equipment is expensive and tedious. Thus, the streamers are immersed in seawater for several consecutive months, at a shallow depth (a few meters), and are generally towed at low speed (e.g., about 5 knots). In these circumstances, the streamers' outer surfaces are subject to fouling, particularly due to the proliferation of microorganisms (i.e., bio-fouling). One of the most common types of microorganisms attaching to streamers is barnacles which adhere permanently to a hard substrate either by growing their shells directly onto the substrate or by means of a stalk.

In time, bio-fouling results in substantial disadvantages such as:

(1) generating hydrodynamic flow noise;
(2) amalgams or incrustations forming on the streamer's outer surfaces, which are likely to disturb seismic measurements;
(3) increasing drag on the streamers and, consequently, increasing fuel consumption to tow them;
(4) a strong, unpleasant stench developing within a few days when streamers covered with bio-fouling are recovered and exposed to air; and
(5) streamer skin being pierced by certain types of bio-fouling, resulting in liquid intake inside the streamer.

Several techniques have been applied conventionally to address the bio-fouling problem. For example, a cleaning device with rotary brushes and/or blades may be temporarily or permanently attached on submerged streamers to clean their outer surfaces. The use of cleaning devices is impeded by the presence of protruding elements (e.g., floaters, or trajectory correction devices known as birds) on the streamers. Although cleaning devices continue to be subject to research and improvement, their practical value (efficiency versus cost) remains questionable.

Another conventional technique used to address the bio-fouling problem involves using antifouling paints (also used on boat hulls). However, antifouling paints do not adhere satisfactory to the polyurethane outer layer of the streamers and therefore do not resist prolonged exposure while streamer is deployed and towed. Furthermore, techniques for applying antifouling paints are hardly compatible with technical and economical constraints linked to seismic streamers because applying these paints is time consuming and costly operation due to the streamer's length. In addition, in order to allow the paint to dry, the painted seismic streamers have to be stored in a manner that requires a considerable amount of space, which is not economically viable onboard a vessel.

Applying a copper coating on the streamer's skin and loading the streamer's skin with a biocide substance are other techniques that have been considered for addressing the bio-fouling problem. However, the copper coating and the streamer's skin are not removable, so the streamers still have to be cleaned in tedious and expensive ways.

Accordingly, it would be desirable to provide devices, systems and methods addressing the bio-fouling problem related to streamers and other equipment used for marine seismic surveys, in an economically attractive manner and avoiding the afore-described problems and drawbacks.

SUMMARY

Removable second skin sections with antifouling properties can be easily mounted on and/or removed from streamers, buoys, birds, deflectors, retrievers and any other equipment deployed in and recovered from water, respectively. Besides reducing damage due to fouling, removable second skin sections reduce turbulences at discontinuity locations along the streamer or other equipment, and reduce the time and effort needed for foul cleaning.

According to one embodiment, there is a seismic equipment usable underwater for marine seismic surveys. The seismic equipment has a first skin configured to separate an inside thereof from surrounding water when the streamer is submerged. The seismic equipment further has a removable second skin section is configured to cover a predetermined area of the first skin. The removable second skin section includes a flexible sheet and a reversible closure system configured to join the flexible sheet's edges.

According to another embodiment, a marine seismic survey system includes a seismic source and a seismic equipment having a first skin configured to separate an inside thereof from surrounding water when the seismic equipment is submerged and a removable second skin section. The removable second skin section is configured to cover a predetermined area of the first skin, and includes a flexible sheet and a reversible closure system configured to join the flexible sheet's edges.

According to another embodiment, there is a method for preventing bio-fouling deposits on portions of a seismic equipment's outer surface. The method includes mounting a protective removable skin section to cover a predetermined portion of the seismic equipment. The protective removable skin section includes a flexible sheet and a reversible closure system configured to join the flexible sheet's edges. The method further includes deploying the seismic equipment in water, recording seismic survey data, and recovering the seismic equipment from the water.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a streamer usable underwater for a marine seismic survey. However, the embodiments to be discussed next are not limited to these structures, but may be applied to other seismic equipment exposed to seawater for long periods.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
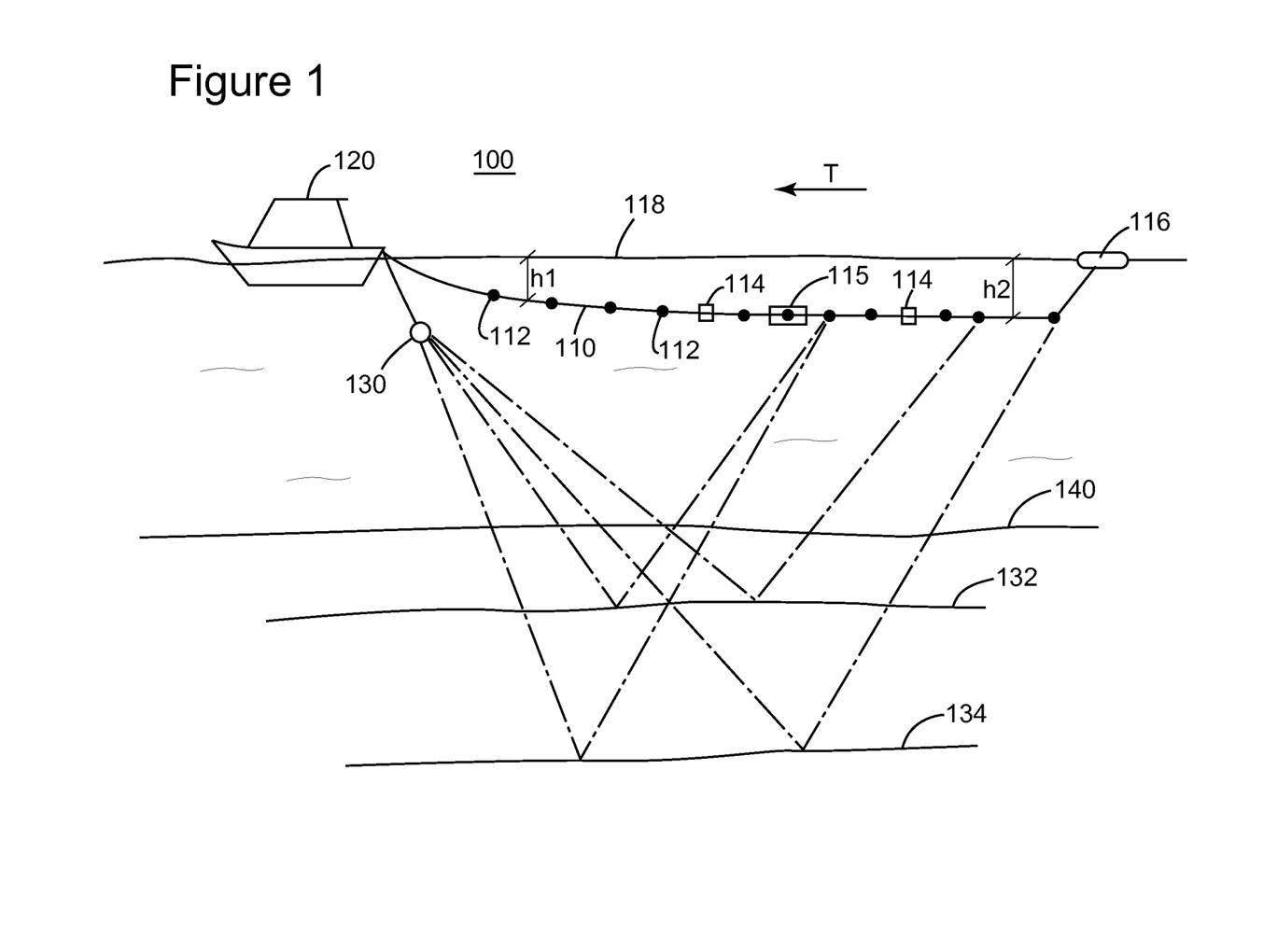
FIG. 1 is a schematic diagram of a marine seismic survey system according to an embodiment.

A marine seismic survey system 100 according to one embodiment is illustrated in FIG. 1. The system includes a streamer 110 towed by a vessel 120. Vessel 120 may also tow a seismic source 130 that generates seismic waves reflected by interfaces such as 132 and 134 between layers having different seismic wave propagation speeds under the seafloor 140. The reflected waves are detected by seismic receivers 112 (only a few are labeled) distributed along streamer 110. In addition to the seismic receivers, the streamer may carry trajectory correction devices 114 (also known as birds) to maintain streamer's predetermined depth profile and lateral position (e.g. relative to the vessel and/or other streamers). The streamer may be configured and operated such that the distance from the streamer to the water surface 118 to vary along the streamer length (e.g., $h_1 < h_2$ in FIG. 1). The streamer 110 may also have a tail buoy 116 attached to its distal end. One or more removable second skin sections are mounted on streamer 110 and/or the other seismic equipment used underwater. At least one portion 115 of the streamer is covered by a removable protective second skin section.

Figure 2:
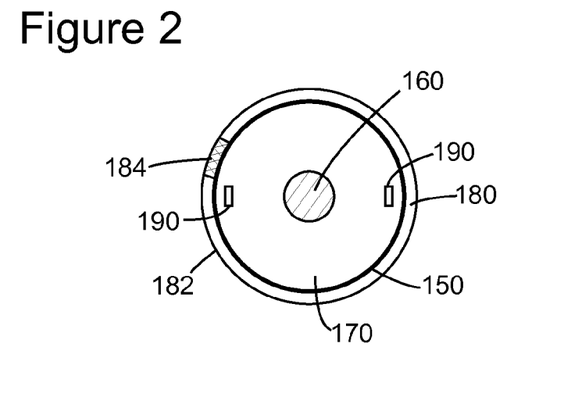
FIG. 2 is cross-section of a streamer according to an embodiment.

FIG. 2 is a cross-section (in a plane perpendicular to the towing direction T) of portion 115 in FIG. 1 of streamer 110. Although the second skin is discussed below relative to a streamer, the second skin may be used for other seismic equipment used underwater during a seismic survey. Streamer jacket 150 (i.e., the streamer's first skin) is configured to separate an inside of the streamer from surrounding water when the streamer is submerged. Streamer jacket 150 may include multiple layers of different materials in order to accomplish different functionalities such as impermeability, flexibility and protection of the instrumentation inside the streamer. Notable, streamer jacket 150 is not removable.

Electrical cables or other electrical components are typically located in a central zone 160 of the streamer. Between central zone 160 and streamer jacket 150, a material lighter than water (e.g., a foam) may fill a predetermined volume 170 to make the streamer's buoyancy neutral. Seismic receivers 190 configured to detect seismic waves (i.e., water pressure variations or particle motions) are placed inside volume 170, next to streamer jacket 150.

The removable protective second skin section 180 is configured to surround the streamer jacket along a predetermined portion of the streamer (e.g., 115 in FIG. 1). This second skin includes a flexible sheet 182 and a reversible closure system 184 configured to join longitudinally the flexible sheet's sides. The flexible sheet may by made of plural layers so that an outer layer may be peeled off to leave another layer exposed.

Figure 3:
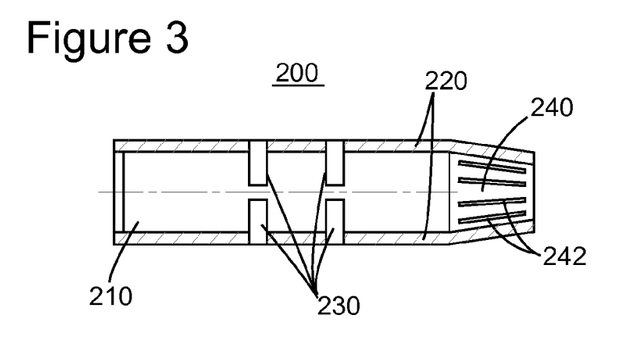
FIG. 3 is an unwrapped protective removable second skin section according to an embodiment.

FIG. 3 illustrates a removable second skin section 200 (i.e., a surface thereof configured to be to be in contact with streamer's outer surface when the removable second skin section is mounted along a portion of a streamer) according to an embodiment. A bird device may be mounted over the portion of the streamer covered with the second skin. Removable second skin section 200 includes a flexible sheet 210 configured to be wrapped around the portion of the streamer. As the streamer is cylindrical, flexible sheet 210 may be rectangular, but this shape is an illustration and not a limitation. Note that the removable second skin section may be tailored to cover other seismic equipment (birds, acoustic devices, electronic modules, retriever devices, buoys, floats, deflectors, control wings, connecting plugs between streamer sections, etc.). The different technical covers can be connected to each other to improve the flow around the retriever/bird/streamer assembly for instance.

A removable second skin section may be tailored to cover the streamer's outer surface for a predetermined length. Portions of the streamer prone to fouling and especially to bio-fouling are known, i.e., predetermined. The removable skin sections are pre-cut (i.e., tailored) to have different lengths as necessary to cover these predetermined portions of the streamer.

A closure system 220 along opposite sides of the rectangular flexible sheet 210 may include one or more of Velcro, Zippertubing, zipper, pressure closure, snaps, magnetic closure, tape, soft glue, or ties. Closure system 220 is configured to be fast reversible (i.e., opened with relatively little effort). Removable second skin section 200 may also include adhesive portions 230 (which may overlap or be apart from the closure system) placed on a second skin section's inner surface so that the removable second skin section adheres better to the streamer's outer surface. The adhesive portions and the closure system are configured to favor easy application and removal of the second skin section. In one embodiment, adhesive portions 230 may cover most of the second skin's inner surface, while in another embodiment they may be arranged as predicted to be most efficient, depending on their width and other characteristics. Preferably, adhesive portions 230 are also configured to separate from the streamer's outer surface without damaging the streamer jacket.

Flexible sheet 210 (or 182 in FIG. 2) may be made of polyurethane, polyvinyl-chloride (PVC), polyamides, anti-abrasive textile/fabrics, fluoropolymer fiber fabrics, a polyester/polyamide combination or a combination thereof.

The flexible sheet's surface exposed to the water when the streamer is deployed may have an antifouling property. Thus, the removable second skin sections not only cover the portions of the streamer prone to bio-fouling, but also diminish bio-fouling. In some embodiments, the antifouling property is achieved by applying a coating such as silicone, a fluored polymer, copper, wax or an antifouling paint (i.e., including molecules with biocides or fungicides). The coating may be a matrix comprising active antifouling molecules/agent. The antifouling molecules/agent may be integrated in the silicone coating or textile used for the flexible sheet. In another embodiment, the antifouling property is achieved by charging the flexible sheet with a biocide substance (e.g., tralopyril) or a non lethal repulsive component (e.g., medetomidine).

In some other embodiments the antifouling property is due to a hydrophobic property of the surface. For example, the hydrophobic property may be due to a micro-textured surface (that may be made of textiles) or to applying a super-hydrophobic nanotechnology coating.

The flexible sheet may have antifouling property on both sides to that the second skin may be reversed (i.e., its initial inside surface to become outside surface and vice-versa) when one side (initially outside) becomes ineffective, worn down.

The antifouling property may also be achieved or enhanced by making the outer surface of the removable second skin section to have a bright color or a reflective surface (e.g., 3M® reflective tape) such that to reflect most of light.

In order to avoid the accordion effect (folding of an upstream portion of the removable second skin section due to friction), second skin section 200 may have a tightening part 240 configured to be mounted on an upstream side of the streamer's second-skin-covered portion. Tightening part 240 may be made of a stretchable material (therefore the apparent smaller width on the right side in FIG. 3) and may be reinforced by ribs 242 to maintain its position and flatness around the streamer while the streamer is towed underwater.

Figure 4:
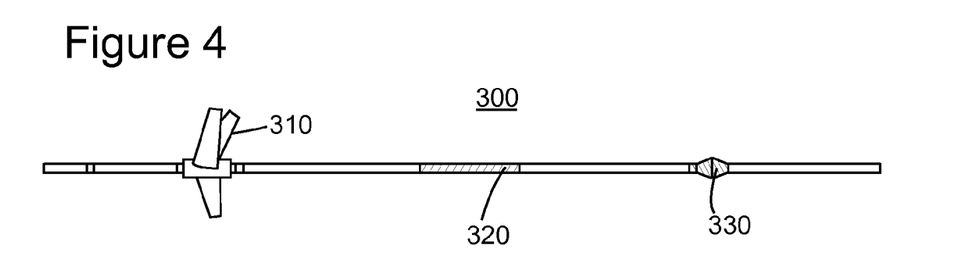
FIG. 4 is a streamer according to an embodiment.

Plural second protective skin sections may be mounted along the same streamer, and may cover portions of different lengths along the streamer. For example, as illustrated in FIG. 4, along a streamer 300 (on which is mounted a bird 310), a first second protective skin section 320 may cover connectors, and a second protective skin section 330 may cover a weight attached to enable maintaining a predefined depth profile while the streamer is towed.

Figure 5:
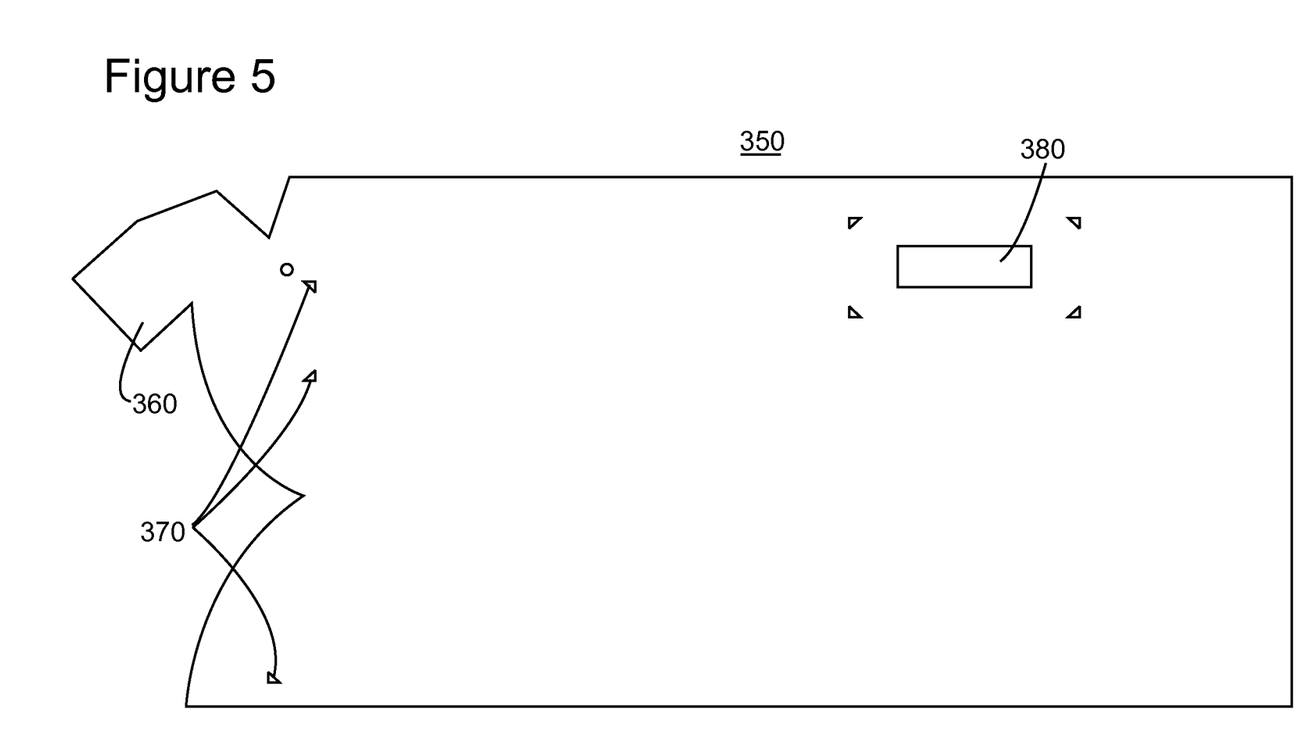
FIG. 5 is a second skin configured to cover a retriever according to an exemplary embodiment.

As previously mentioned, a second skin may be applied to protect against fouling equipment other than streamers, such as, birds, retrievers, buoys, deflectors, etc. FIG. 5 is an exemplary illustration of a second skin 350 configured to cover a retriever (i.e., a device used for streamer recovery), the second skin being illustrated unfolded prior to being mounted on the retriever.

Since the other equipment may have a more complex three-dimensional shape, the second skin configured to cover the equipment may be tailored or made of plural parts connected by similar closing elements as in the case of streamer or a variety/combination thereof, i.e., velcro, magnets, snaps, ties, zips, etc. Additionally, the second skin may include plural flaps, such as, 360. The previously-discussed materials and techniques employed to prevent antifouling for streamer's second skin are pertinent for these other equipment's second skin.

Besides having a more complex shape achieved by connecting plural parts or tailoring, these second skins may also have holes (such as, 370, only some of the holes are labeled) or windows (such as, 380) cut there-through to allow the equipment to perform its predefined functions (e.g., for sensors, airbag path for retrievers, etc.). Foam may be pasted or sewed on such second skins so that the equipment covered by the second skin to have a smooth hydrodynamic shape.

Figure 6:
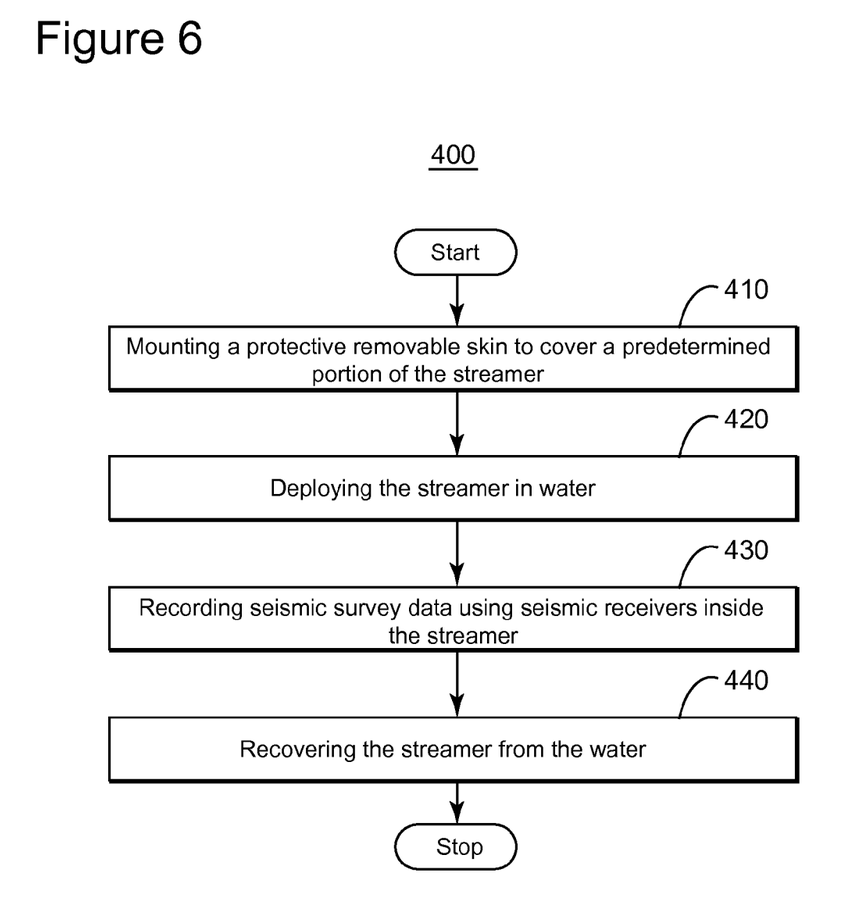
FIG. 6 is a flowchart of a method for preventing bio-fouling deposits on portions of an outer surface of a streamer according to an embodiment.

FIG. 6 is a flowchart of a method 400 for preventing bio-fouling deposits on portions of an outer surface of a streamer (or other seismic equipment) according to an embodiment. Method 400 includes mounting a protective removable skin section to cover a predetermined portion of the streamer at 410. The protective removable skin section may be any of the above-described embodiments, thus, including a flexible sheet and a fast reversible closure system configured to join longitudinally the flexible sheet's sides.

Method 400 further includes deploying the streamer in water at 420, recording seismic survey data using seismic receivers inside the streamer at 430, and recovering the streamer at 440. After the streamer is recovered, its protective removable skin section may be removed aboard the vessel. In one embodiment, the protective removable skin may be removed every time the streamer is recovered from water. In another embodiment, removing the protective removable skin may be optional, depending on whether at least one removal condition is met as discussed in the next paragraph. Mounting and removing the second skin may occur on a deck of a vessel, while the streamer is deployed or recovered, respectively or during workboat operation of maintenance at sea. For example, when the second skin is made of plural layer an outer layer may be peeled at sea during such an operation.

Removal of the protective removable skin may be performed if the streamer has been subjected to a predetermined number of deploying/recovering operations after mounting the protective skin. Alternatively or additionally, removal of the protective removable skin may be performed if the streamer has been underwater a predetermined amount of time after mounting the protective skin section. The decision of whether or not to remove a protective removable skin section may belong to an operator supervising recovery of the streamer. This decision may globally apply to all protective removable skin sections and/or all streamers of the marine system or may be specific to an individual protective removable skin section.

Figure 7:
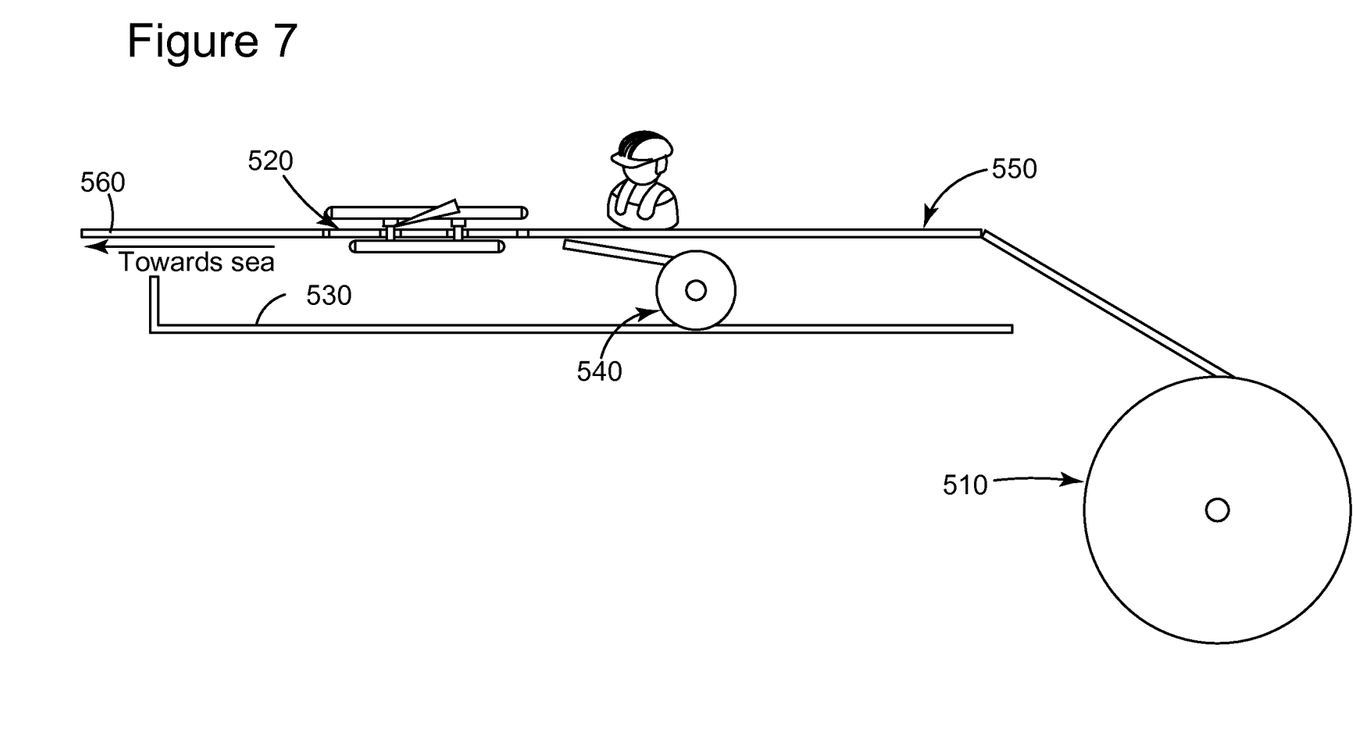
FIG. 7 illustrates a process of mounting the protective removable skin sections on the streamer according to an embodiment.

FIG. 7 illustrates protective removable skin sections mounted on a streamer as the streamer is deployed in the water. A streamer spool 510 may be stored on a lower deck of a vessel. While the streamer is unrolled from the spool 510 to enter the sea, it passes through a mounting area 520 on an upper deck 530 where removable second skin sections are stored on a second spool 540. In mounting area 520, removable second skin sections are applied to cover predetermined sections of the "naked" streamer 550. A worker may manually join sides of the flexible material, or a machine may perform this operation automatically. Thus, after passing through the mounting area 520, streamer 560 carries one or more removable second skin sections. Birds and retriever can be covered during transit period out of production (in hidden time). The assembly is finalized during the deployment.

The above-described operation may be reversed when the streamer is recovered from the water. The closure system of a removable second skin section on streamer 560 is opened while passing through the mounting area 520, so that the second skin section separates from the "naked" streamer which is then stored on spool 510.

Figure 8A:
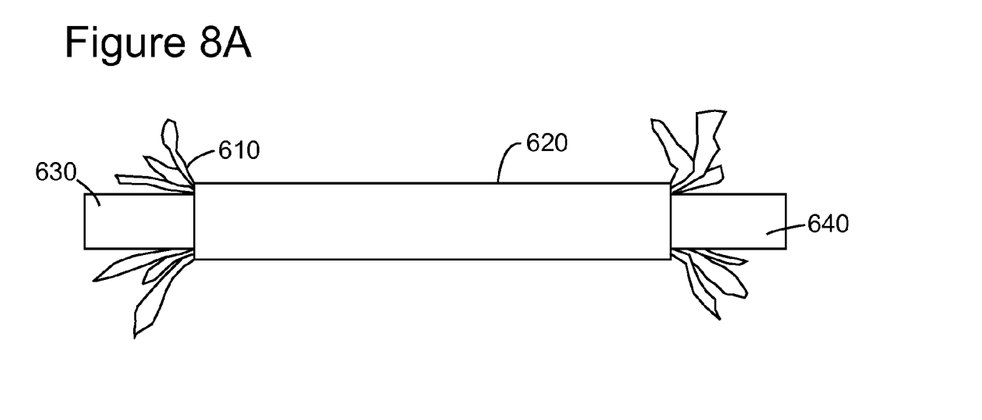
FIG. 8A illustrates locations favorable to abundant barnacle growth on a streamer unprotected by the protective removable skin section.
Figure 8B:
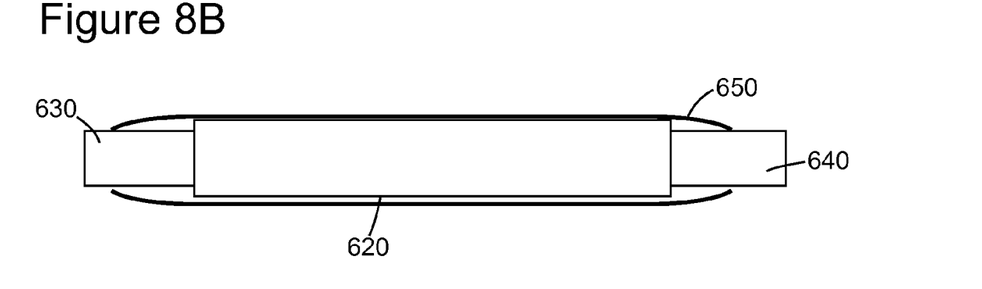
FIG. 8B illustrates the effect of using the protective removable skin sections at these locations.

It has been observed that barnacles tend to attach and grow at locations along the streamer at which the profile has discontinuities, and, thus, turbulences. For example, as illustrated in FIG. 8A, barnacle 610 grows in abundance at locations at which the diameter varies (portion 620 having a larger diameter than the adjacent portions 630 and 640) such as bird collars and weights. One advantage of using a removable second skin section 650 (in addition to local bio-fouling protection) is that such discontinuities are smoothed out, as illustrated in FIG. 8B, diminishing turbulences, combining different shape and enclose volume inside to create fairings.

Another advantage is that the removable second skin sections are separated from the streamer with relatively little effort, and, at the same time, any fouling deposited thereon is removed. Thus, the expense and effort to clean the streamer is substantially decreased. On the other hand, the removable second skin sections may be cleaned and recycled onboard or later on the shore, being less cumbersome than cleaning the heavy, bulky streamers.

Another advantage is that toxic substances such as antifouling paints may be applied and dried on the removable second skin sections before the removable second skin sections are brought onboard the vessel, thereby avoiding the problem of safely and economically applying antifouling paints onboard. The use of second skins (which are really light) also provides the advantage of reducing the logistics costs, since it removes the need to paint each piece of equipment.

The disclosed exemplary embodiments provide removable second skin sections, seismic equipment with at least one removable second skin section, and related methods for protecting seismic equipment against bio-fouling. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic equipment usable underwater for marine seismic surveys, the seismic equipment comprising:
a first skin configured to separate an inside of the seismic equipment from surrounding water when the seismic equipment is submerged;
a removable second skin section configured to cover a predetermined area of the first skin, the removable second skin section including
a flexible sheet tailored or made of plural parts to cover the predetermined area and smooth a shape thereof; and
a reversible closure system configured to join edges of the flexible sheet as the removable second skin is mounted over the predetermined area, wherein the reversible closure system is opened to separate the edges for removing the removable second skin from the predetermined area.

2. The seismic equipment of claim 1, wherein the flexible sheet has adhesive portions on an inner surface of the flexible sheet that adheres to an outer surface of the seismic equipment.

3. The seismic equipment of claim 1, wherein the flexible sheet is selected from one of polyurethane, polyvinyl-chloride (PVC), polyamides, anti-abrasive textile/fabrics, fluoropolymers fibers fabrics, a polyester/polyamide combination or a combination thereof.

4. The seismic equipment of claim 1, wherein a surface of the flexible sheet, which surface is exposed to the water when the seismic equipment is submerged, has an antifouling property.

5. The seismic equipment of claim 4, wherein the antifouling property is due to a silicone coating, a fluored polymer, copper or an antifouling paint.

6. The seismic equipment of claim 4, wherein the antifouling property is due to a hydrophobic property of the surface.

7. The seismic equipment of claim 6, wherein the hydrophobic property is due to a micro-textured surface, or to applying a super-hydrophobic nanotechnology coating.

8. The seismic equipment of claim 4, wherein the antifouling property is due to the flexible sheet being charged with a biocide substance or with a repulsive non lethal substance.

9. The seismic equipment of claim 4, wherein the antifouling property is achieved by making the surface to have a bright color or reflective surfaces to reflect most of light.

10. The seismic equipment of claim 1, wherein the removable second skin section has a tightening part configured to be mounted on an upstream part of the predetermined portion of the seismic equipment, the tightening part being reinforced to maintain its position and flatness around the streamer while the streamer is towed underwater.

11. The seismic equipment of claim 1, wherein the reversible closure system includes at least one of hook and loop strips, zippertubing type of closure, zipper, ties and pressure closure.

12. The seismic equipment of claim 1, further comprising:
an additional removable second skin section configured to surround the first skin along a second predetermined portion of the seismic equipment, wherein the removable second skin section and the additional removable second skin section have different shapes or lengths.

13. A marine seismic survey system, comprising:
a seismic source; and
a seismic equipment having
    a first skin configured to separate an inside of the seismic equipment from surrounding water when the seismic equipment is submerged;
    a removable second skin section configured to cover a predetermined area of the first skin, the removable second skin section including
    a flexible sheet tailored or made of plural parts to cover the predetermined area of the first skin and smooth a shape thereof; and
    a reversible closure system configured to join edges of the flexible sheet as the removable second skin is mounted over the predetermined area, wherein the reversible closure system is opened to separate the edges for removing the removable second skin from the predetermined area.

14. The marine seismic survey system of claim 13, wherein the flexible sheet has adhesive portions on an inner surface of the flexible sheet that adheres to an outer surface of the seismic equipment.

15. The marine seismic survey system of claim 13, wherein a surface of the flexible sheet, which surface is exposed to water when the seismic equipment is deployed, has an antifouling property.

16. A method for preventing bio-fouling deposits on portions of an outer surface of a seismic equipment, the method comprising:
    mounting a protective removable skin section to cover a predetermined portion of the seismic equipment, the protective removable skin section including
        a flexible sheet tailored or made of plural parts to cover the predetermined portion of the seismic equipment and smooth a shape thereof, and
        a reversible closure system configured to join edges of the flexible sheet for the mounting of the protective removable skin section and to separate the edges for removing the protective removable skin section from the predetermined area;
    deploying the seismic equipment in water;
    recording seismic survey data;
    recovering the seismic equipment from the water; and
    opening the reversible closure system to separate the removable second skin section from the seismic equipment.

17. The method of claim 16, further comprising:
removing the protective removable skin section from the seismic equipment.

18. The method of claim 16, further comprising:
removing the protective removable skin section from the seismic equipment if the seismic equipment has been subjected to a predetermined number of deploying/recovering operations after mounting the protective removable skin section.

19. The method of claim 16, further comprising:
removing the protective removable skin section from the seismic equipment if the seismic equipment has been underwater a predetermined amount of time after mounting the protective removable skin section.

20. The method of claim 16, further comprising:
removing and recycling the protective removable skin section.

* * * * *